(12) United States Patent　(10) Patent No.: US 10,287,957 B2
Nakata　(45) Date of Patent: May 14, 2019

(54) EXHAUST GAS PURIFICATION DEVICE

(71) Applicant: DENSO CORPORATION, Kariya, Aichi-pref. (JP)

(72) Inventor: Shingo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 15/552,367

(22) PCT Filed: Mar. 23, 2016

(86) PCT No.: PCT/JP2016/001666
§ 371 (c)(1),
(2) Date: Aug. 21, 2017

(87) PCT Pub. No.: WO2016/163087
PCT Pub. Date: Oct. 13, 2016

(65) Prior Publication Data
US 2018/0038259 A1　Feb. 8, 2018

(30) Foreign Application Priority Data

Apr. 6, 2015　(JP) ................................. 2015-077642

(51) Int. Cl.
*F01N 9/00*　(2006.01)
*F01N 3/023*　(2006.01)
(Continued)

(52) U.S. Cl.
CPC ............. *F01N 9/002* (2013.01); *F01N 3/023* (2013.01); *F01N 3/035* (2013.01); *F01N 11/00* (2013.01);
(Continued)

(58) Field of Classification Search
CPC .......... F01N 3/023; F01N 3/035; F01N 9/002; F01N 11/00; F01N 11/005;
(Continued)

(56) References Cited

U.S. PATENT DOCUMENTS 8,640,441 B2 *　2/2014　Tylutki .................... F01N 11/00
　　　　　　　　　　　　　　　　60/276
2009/0145111 A1 *　6/2009　Takahashi ............ B01D 53/944
　　　　　　　　　　　　　　　　60/277

(Continued)

FOREIGN PATENT DOCUMENTS

JP　　　2009-103066　　5/2009

*Primary Examiner* — Audrey K Bradley
(74) *Attorney, Agent, or Firm* — Nixon & Vanderhye PC (57) ABSTRACT

An exhaust gas purification device includes: an actual pressure difference obtainer that acquires an actual pressure difference which is an actual measurement value of a pressure difference of a filter; a flow rate obtainer that acquires a flow rate of exhaust gas flowing into the filter; a calculation pressure difference calculator that calculates a calculation pressure difference which is a calculated value of the pressure difference of the filter in a normal state when the exhaust gas flows into the filter with the flow rate acquired by the flow rate obtainer; and an abnormality determiner that performs an abnormality determination of the filter based on a pressure difference variation ratio which is a ratio between a variation in the actual pressure difference and a variation in the calculation pressure difference in response to a variation in the flow rate of the exhaust gas.

3 Claims, 4 Drawing Sheets

(51) Int. Cl.
  *F01N 11/00*  (2006.01)
  *F01N 3/035*  (2006.01)
(52) U.S. Cl.
  CPC ...... *F01N 2550/00* (2013.01); *F01N 2550/04* (2013.01); *F01N 2900/1406* (2013.01); *F01N 2900/1411* (2013.01); *Y02T 10/47* (2013.01)
(58) Field of Classification Search
  CPC ............ F01N 2550/00; F01N 2550/04; F01N 2560/08; F01N 2900/1406; F01N 2900/11; F01N 11/002; Y02T 10/47
  See application file for complete search history.

(56) References Cited

U.S. PATENT DOCUMENTS

| | | |
|---|---|---|
| 2010/0018186 A1 | 1/2010 | Shibata et al. |
| 2012/0006009 A1* | 1/2012 | Jonouchi ................ F01N 9/002 60/277 |
| 2012/0023911 A1* | 2/2012 | Liu ....................... F01N 11/002 60/277 |
| 2016/0206981 A1* | 7/2016 | Pursifull ............. B01D 35/143 |
| 2016/0251995 A1* | 9/2016 | Tsunooka ................ F01N 3/021 701/33.7 |

* cited by examiner

EXHAUST GAS PURIFICATION DEVICE

CROSS REFERENCE TO RELATED APPLICATION

This application is the U.S. national phase of International Application No. PCT/JP2016/001666 filed on Mar. 23, 2016 which designated the U.S. and claims priority to Japanese Patent Application No. 2015-77642 filed on Apr. 6, 2015, the entire contents of each of which are incorporated herein by reference.

TECHNICAL FIELD

The present disclosure relates to an exhaust gas purification device which purifies an exhaust gas discharged from an internal-combustion engine and flowing through an exhaust piping.

BACKGROUND ART

In recent years, it is required to reduce particulate matter (Particulate Matter: PM) discharged with exhaust gas from an internal-combustion engine, and the legal control is strengthened. Therefore, in case of a diesel engine, it is common to remove particulate matter by preparing a filter in the course of exhaust gas. The filter collects and removes the particulate matter from the exhaust gas passing through the filter. Such a removal of the particulate matter using a filter is investigated also for a gasoline engine.

If the collected particulate matters are accumulated too much, exhaust gas cannot pass through the filter. As a result, the fuel consumption of the internal-combustion engine is increased. For this reason, it is necessary to remove the particulate matter accumulated on the filter by burning, before the collected particulate matters are accumulated too much, as a reproduction process for recovering the function.

Moreover, in the reproduction process, if an abnormality such as melting or crack arises, since the temperature of the filter is raised too much, the particulate matter cannot appropriately be collected. Therefore, it is desirable to detect the abnormality in the filter, in addition to the reproduction process.

Patent Literature 1 describes a system including a pressure difference sensor to presume the quantity of particulate matters deposited on a filter and to perform an abnormality determination of the filter. In detail, the system detects an abnormality in the filter based on a variation in the pressure difference between an upstream side and a downstream side of the filter (hereafter this is also called as "a pressure difference of a filter"). An offset error may be generated in the pressure difference sensor. In Patent Literature 1, the influence of the offset error is eliminated by performing the abnormality determination of the filter based on the variation in the pressure difference of the filter, such that the detection accuracy is raised.

PRIOR ART LITERATURES

Patent Literature

Patent Literature 1: JP 2007-327392 A

SUMMARY OF INVENTION

The pressure difference of the filter is sharply changed by a change in the operational status of the internal-combustion engine. Therefore, when the abnormality determination of the filter is performed, for example, based on a comparison between the pressure difference of the filter and a threshold value, it will be necessary to prepare the threshold value for each operational status of the internal-combustion engine, and the determination algorithm may become complicated.

On the other hand, the abnormality determination of the filter may be performed only when the internal-combustion engine is in a specific operational status, so as to reduce the number of the threshold values to be prepared. However, in this case, the opportunity to perform the abnormality determination might become insufficient. As a result, the accuracy of the abnormality determination might fall.

It is an object of the present disclosure to provide an exhaust gas purification device which can perform an abnormality determination of a filter with high accuracy based on a pressure difference between an upstream side and a downstream side of the filter.

According to an aspect of the present disclosure, an exhaust gas purification device that purifies an exhaust gas exhausted from an internal-combustion engine and flowing through an exhaust piping includes: a filter disposed in the exhaust piping to collect a particulate matter from the exhaust gas passing through the filter; an actual pressure difference obtainer that acquires an actual pressure difference which is an actual measurement value of a pressure difference between an upstream side and a downstream side of the filter; a flow rate obtainer that acquires a flow rate of the exhaust gas flowing into the filter; a calculation pressure difference calculator that calculates a calculation pressure difference which is a calculated value of the pressure difference between the upstream side and the downstream side of the filter in a normal state when the exhaust gas flows into the filter with the flow rate acquired by the flow rate obtainer; and an abnormality determiner that performs an abnormality determination of the filter. The abnormality determiner performs the abnormality determination of the filter based on a pressure difference variation ratio which is a ratio between a variation in the actual pressure difference and a variation in the calculation pressure difference in response to a variation in the flow rate of the exhaust gas.

The abnormality determination of the filter is performed based on the pressure difference variation ratio which is a ratio of the variation in the actual pressure difference and the variation in the calculation pressure difference in response to a variation in the flow rate of exhaust gas. When the filter has no abnormality such as excessive deposition of particulate matter nor melting, the pressure difference variation ratio is approximately uniform, not depending on the operational status of the internal-combustion engine. If an abnormality arises in the filter, the pressure difference variation ratio will be changed. Therefore, the abnormality determination of the filter is performed based on the pressure difference variation ratio, such that the determination accuracy can be raised while there is no necessity of preparing threshold values for each operational status of the internal-combustion engine.

The pressure difference variation ratio is a ratio ($\Delta Pc/\Delta Pr$) of the variation ($\Delta Pc$) in the calculation pressure difference to the variation ($\Delta Pr$) in the actual pressure difference, or a ratio ($\Delta Pr/\Delta Pc$) of the variation ($\Delta Pr$) in the actual pressure difference to the variation ($\Delta Pc$) in the calculation pressure difference. That is, the pressure difference variation ratio is defined by a relative ratio between the variation in the actual pressure difference ($\Delta Pr$) and the variation in the calculation pressure difference ($\Delta Pc$).

Accordingly, the exhaust gas purification device can be offered, which can perform the abnormality determination of the filter at high accuracy based on the pressure difference between the upstream side and the downstream side of the filter.

DESCRIPTION OF EMBODIMENTS

Hereafter, an embodiment is described, referring to the drawings. For easy understanding, same or equivalent portions among respective drawings are labeled with same reference numerals, and the redundant explanation is omitted.

Figure 1:
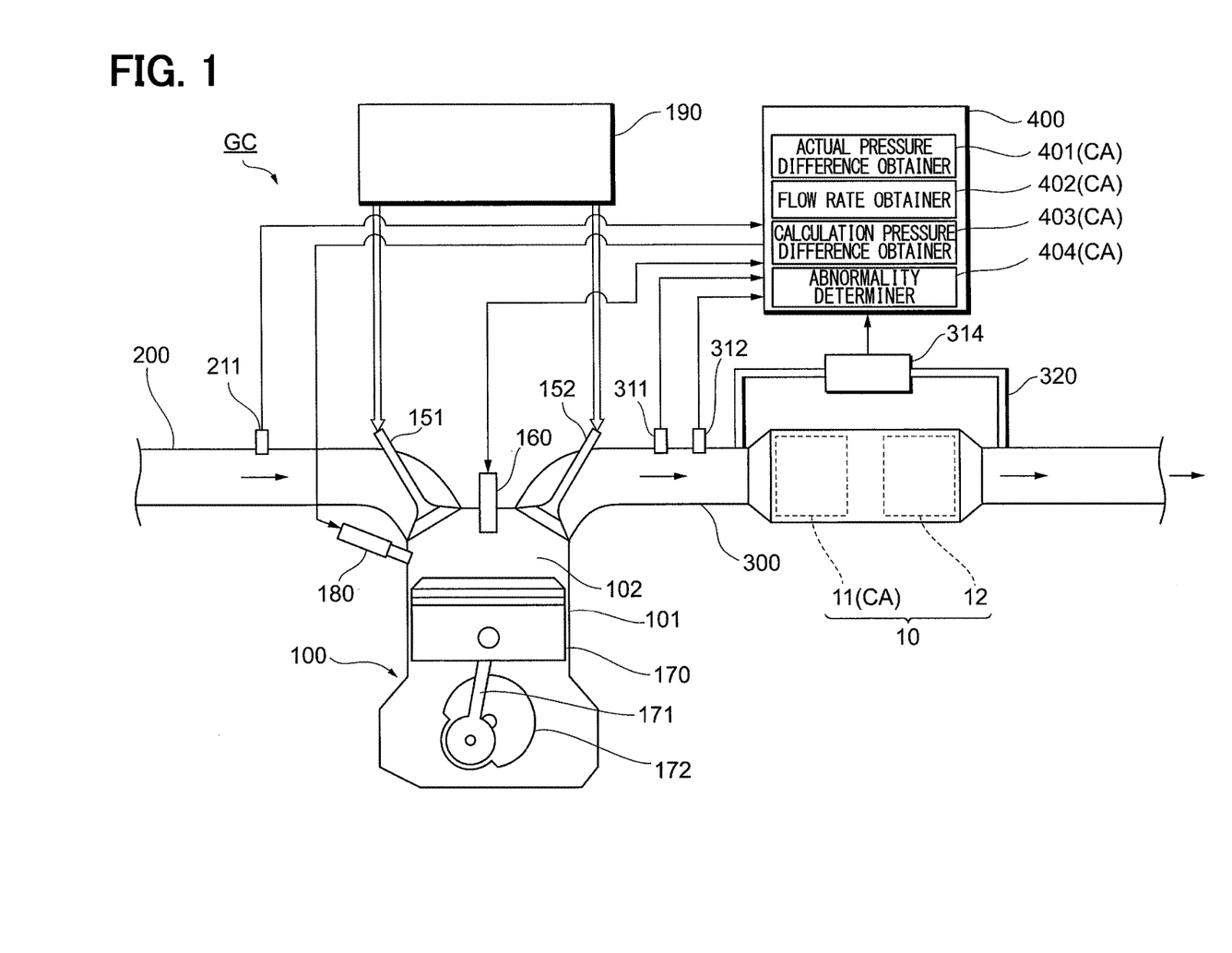
FIG. 1 is a schematic diagram illustrating a vehicle including an exhaust gas purification device according to an embodiment.

An exhaust gas purification device CA according to an embodiment is explained referring to FIG. 1. The exhaust gas purification device CA purifies exhaust gas discharged from a gasoline engine 100 (hereafter referred as "engine 100") in a vehicle GC. First, the configuration of the vehicle GC is explained referring to FIG. 1.

In FIG. 1, only the engine 100 and the periphery configuration of the vehicle GC are typically shown, and the illustration of the other configuration is omitted. As shown in FIG. 1, the vehicle GC includes an intake piping 200, an exhaust piping 300 in addition to the engine 100.

The engine 100 is a gasoline engine equipped with four cylinders 101. In this embodiment, the engine 100 is a direct injection-type internal-combustion engine in which gasoline, which is fuel, is directly injected into a combustion chamber 102. Since the configuration and the control are the same among the cylinders 101, illustration and explanation are made only about the single cylinder 101 in the following explanation.

An intake valve 151, an exhaust valve 152, an opening-and-closing adjustment mechanism 190, a spark plug 160, a piston 170, and an injector 180 are prepared in each of the cylinders 101. The combustion chamber 102 is formed inside of the cylinder 101 as a space where a mixture of fuel and air is combusted.

The intake valve 151 is a valve arranged at a connection section of the intake piping 200 and the cylinder 101. When the intake valve 151 is in the open state, supply of air to the combustion chamber 102 is started. When the intake valve 151 is in the closed state, the supply of air to the combustion chamber 102 is stopped.

The exhaust valve 152 is a valve arranged at a connection section of the exhaust piping 300 and the cylinder 101. When the exhaust valve 152 is in the open state, discharge of the exhaust gas to the exhaust piping 300 from the combustion chamber 102 is started. When the exhaust valve 152 is in the closed state, the discharge of the exhaust gas to the exhaust piping 300 from the combustion chamber 102 is stopped.

The opening-and-closing adjustment mechanism 190 is a mechanism for making each of the intake valve 151 and the exhaust valve 152 to open or close. An intake stroke, a compression stroke, a combustion stroke, and an exhaust stroke are performed in each of the cylinders 101 by the opening-and-closing adjustment mechanism 190, which opens or closes the intake valve 151 and the exhaust valve 152 at suitable timing.

The opening-and-closing adjustment mechanism 190 is configured as a variable valve timing mechanism equipped with a WT pulley (not shown). The opening-and-closing timing of the intake valve 151 and the exhaust valve 152 is not fixed, while the above-mentioned four strokes are performed, and can be changed by the opening-and-closing adjustment mechanism 190.

Specifically, a deviation (overlap) between the end timing of the exhaust stroke at which the exhaust valve 152 becomes in the closed state and the start timing of the intake stroke at which the intake valve 151 becomes in the open state can be controlled by the opening-and-closing adjustment mechanism 190. Opening-and-closing operation of the intake valve 151 and the exhaust valve 152 is controlled by a control device 400.

The spark plug 160 performs spark ignition, and lights the fuel-air mixture in the combustion chamber 102. The timing at which the spark ignition is performed with the spark plug 160 (ignition timing), i.e., the start timing of the combustion stroke is controlled by the control device 400.

The piston 170 carries out both-way movement in the up-and-down direction, inside the cylinder 101. The combustion chamber 102 is formed above the piston 170 in the space of the cylinder 101.

In the compression stroke of the engine 100, when the piston 170 moves upward, the capacity of the combustion chamber 102 decreases. In the combustion stroke of the engine 100, the piston 170 is depressed downward by combustion (explosion) of the fuel in the combustion chamber 102. A connecting rod 171 and a crankshaft 172 are arranged under the piston 170. The both-way movement of the piston 170 is changed into rotational movement by the crankshaft 172 and the like. Thereby, the explosive power produced in the combustion chamber 102 is changed into the driving force of the vehicle GC.

The injector 180 is an opening-and-closing valve for directly injecting fuel into the combustion chamber 102. The timing and amount of fuel supplied by the injector 180 into the combustion chamber 102 is controlled by the control device 400.

The intake piping 200 supplies air to the cylinder 101. A throttle valve (not shown) is arranged at the intake piping 200. The flow rate of air supplied to the cylinder 101 is adjusted by the throttle valve which opens and closes according to a driver's accelerator operation. Moreover, a flow sensor 211 is disposed in the intake piping 200. The flow sensor 211 is electrically connected with the control device 400. The flow sensor 211 detects the flow rate of air (intake air flow rate) supplied to the cylinder 101 through the intake piping 200, and transmits a signal corresponding to the detected flow rate to the control device 400. In addition, "electrically connected" is not limited to a state where connected by a cable, and includes a state where a communication is possible by radio.

The exhaust piping 300 is a manifold-shaped piping which takes in the exhaust gas discharged from each of the cylinders 101 of the engine 100, and the exhaust gas passing through inside is made to join and is led to outside of the vehicle GC. A purification functional part 10, an air/fuel ratio sensor 311, an exhaust gas temperature sensor 312, a bypass pipe 320, and a pressure difference sensor 314 are disposed in the exhaust piping 300.

The purification functional part 10 includes a three-way catalyst 11 and a filter 12. The three-way catalyst 11 has, for example, a honeycomb shape, and is configured so that the exhaust gas which flows through the exhaust piping 300 can pass through. The three-way catalyst 11 includes a catalyst carrier (not shown) which supports platinum, palladium, or rhodium as metal catalyst. The three-way catalyst 11 purifies, by oxidizing or chemical reduction, toxic substance (hydrocarbon, carbon monoxide, nitrogen oxide) in exhaust gas, due to the catalytic action of the metal catalyst.

The filter 12 is located downstream of the three-way catalyst 11 in the exhaust piping 300. The filter 12 presents the shape of, for example, a honeycomb and is configured so that the exhaust gas which flows from the three-way catalyst 11 can pass through. The filter 12 is also called as GPF (Gasoline Particle Filter), and removes the particulate matter by collecting from the exhaust gas passing through, such that the exhaust gas is made clean.

The air/fuel ratio sensor 311 is located upstream of the purification functional part 10 in the exhaust piping 300. The air/fuel ratio sensor 311 detects the air/fuel ratio of the exhaust gas discharged from the engine 100 and flowing through the exhaust piping 300. The air/fuel ratio sensor 311 is electrically connected with the control device 400, and transmits a signal corresponding to the detected air/fuel ratio to the control device 400.

The exhaust gas temperature sensor 312 is located upstream of the purification functional part 10 in the exhaust piping 300. The exhaust gas temperature sensor 312 detects the temperature of the exhaust gas discharged from the engine 100 and flowing through the exhaust piping 300. The exhaust gas temperature sensor 312 is electrically connected with the control device 400, and transmits a signal corresponding to the detected temperature to the control device 400.

The bypass pipe 320 is a tubular component bypassing the purification functional part 10, and extends from the exhaust piping 300 upstream of the purification functional part 10 to the downstream side. The bypass pipe 320 and the exhaust piping 300 are communicated with each other, and the internal pressure inside the exhaust piping 300 can be transmitted to the bypass pipe 320.

The pressure difference sensor 314 is formed in the middle of the bypass pipe 320. The pressure difference sensor 314 detects a pressure of the exhaust gas discharged from the engine 100 and flowing through the exhaust piping 300. Furthermore, the pressure difference sensor 314 detects also a difference between a pressure transmitted from the upstream side of the bypass pipe 320 and a pressure transmitted from the downstream side of the bypass pipe 320. The pressure difference sensor 314 is electrically connected with the control device 400, and transmits a signal corresponding to the detected value to the control device 400. An offset error which is a system error may be generated in the value detected by the pressure difference sensor 314.

Next, the control device 400 is explained. A part or all of the control device 400 is configured by analog circuitry, or a digital processor. A functional control block is configured by the control device 400 in order to achieve the function to output a control signal based on the received signals.

FIG. 1 illustrates the control device 400 as a functional control block diagram. In addition, a software module to be included in the analog circuitry or the digital processor which configures the control device 400 does not necessarily need to be divided into the control blocks shown in FIG. 1, and may be configured as what works as plural control blocks, and also may be subdivided. The actual configuration inside the control device 400 may be suitably changed by a person skilled in the art, so that processing to be mentioned later can be performed.

The control device 400 is electrically connected with various sensors such as the air/fuel ratio sensor 311 and various actuators such as the opening-and-closing adjustment mechanism 190, and is an electronic device which controls operation of the engine 100. The control device 400 has an actual pressure difference obtainer 401, a flow rate obtainer 402, a calculation pressure difference calculator 403, and an abnormality determiner 404.

The actual pressure difference obtainer 401 performs a predetermined operation based on the signal received from the pressure difference sensor 314, to obtain the pressure difference between the upstream side and the downstream side of the purification functional part 10, that is, an actual pressure difference which is an actual measurement value of the pressure difference between the upstream side and the downstream side of the filter 12 (hereafter may be called as "the pressure difference of the filter 12").

The flow rate obtainer 402 performs a predetermined operation based on the signal received from the pressure difference sensor 314, and calculates the flow rate of the exhaust gas which flows through the exhaust piping 300 and flows into the filter 12. Specifically, the flow rate obtainer 402 memorizes a table, in advance, including the flow rate of the exhaust gas corresponding to the pressure difference of the filter 12. The flow rate obtainer 402 calculates the flow rate of exhaust gas by referring the signal received from the pressure difference sensor 314 to the table. The table is created based on the actual measurement values of the pressure difference of the filter 12 and the actual measurement values of the flow rate of exhaust gas, which are detected when the engine 100 is operated at various conditions, before the vehicle GC is supplied to the market.

The calculation pressure difference calculator 403 performs a predetermined operation based on the flow rate of the exhaust gas acquired by the flow rate obtainer 402, and calculates the calculation pressure difference which is a calculated value of the pressure difference of the filter 12. Specifically, the calculation pressure difference calculator 403 memorizes, in advance, a table including the pressure difference of the filter 12 corresponding to the flow rate of the exhaust gas which flows into the filter 12. The calculation pressure difference calculator 403 calculates the calculation pressure difference by referring the flow rate of the exhaust gas acquired by the flow rate obtainer 402 to the table. The table is created based on the actual measurement values of the flow rate of the exhaust gas and the actual measurement values of the pressure difference of the filter 12 detected when the engine 100 is operated at various conditions, before the vehicle GC is supplied to the market, using the filter 12 in the normal state without melting nor crack, and no particulate matter accumulates on the filter 12.

The abnormality determiner 404 performs the abnormality determination of the filter 12. Although the details will be mentioned later, first, the abnormality determiner 404 calculates a variation in the actual pressure difference and a variation in the calculation pressure difference, and calculates a pressure difference variation ratio which is a ratio of the variation in the calculation pressure difference to the variation in the actual pressure difference. Furthermore, the abnormality determiner 404 determines whether an abnormality such as excessive deposition of particulate matter, melting, or crack arises in the filter 12 based on the pressure difference variation ratio.

Figure 2:
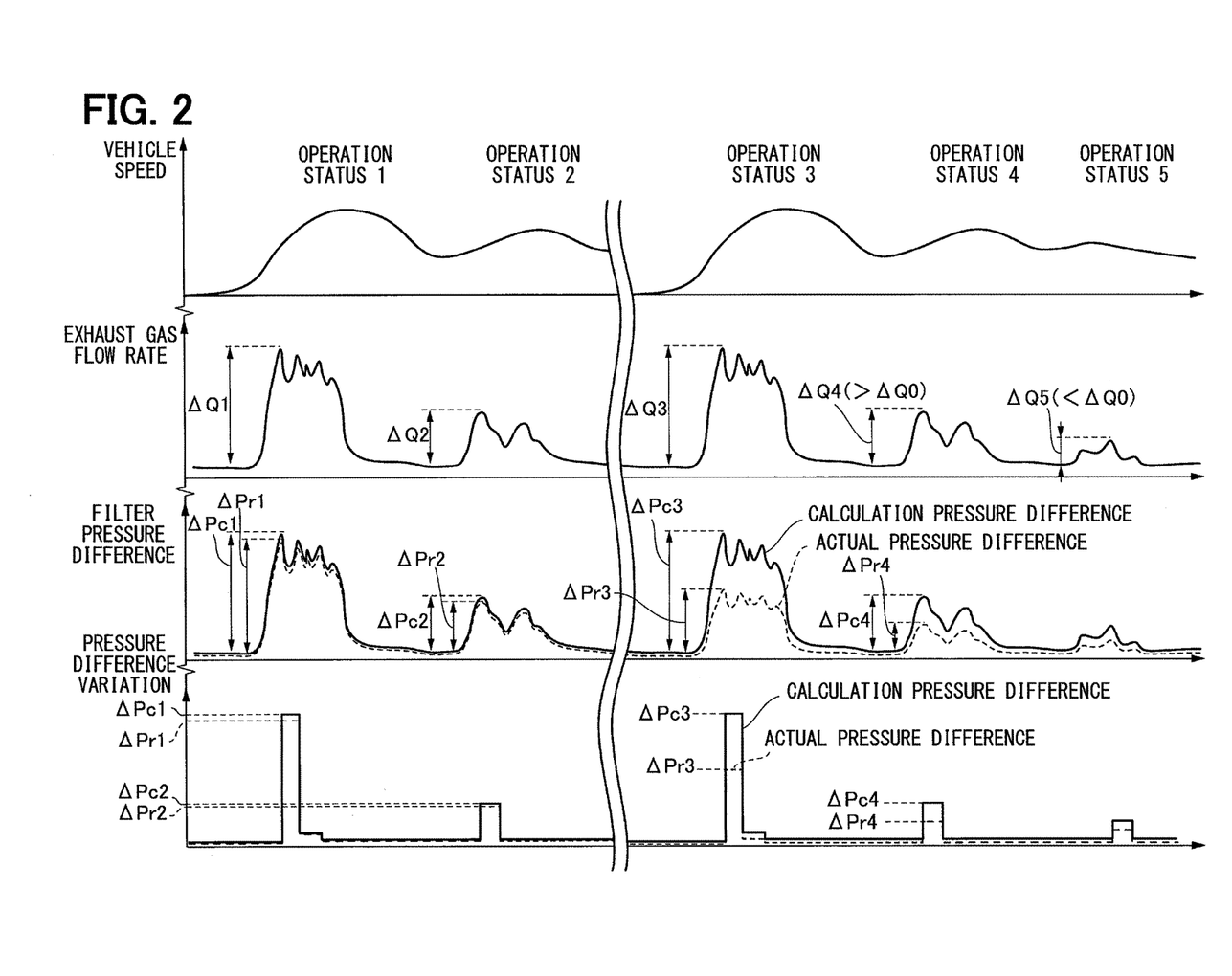
FIG. 2 is a graph illustrating variations in an actual pressure difference acquired by an actual pressure difference obtainer and a calculation pressure difference computed by a calculation pressure difference calculator of FIG. 1.
Figure 3:
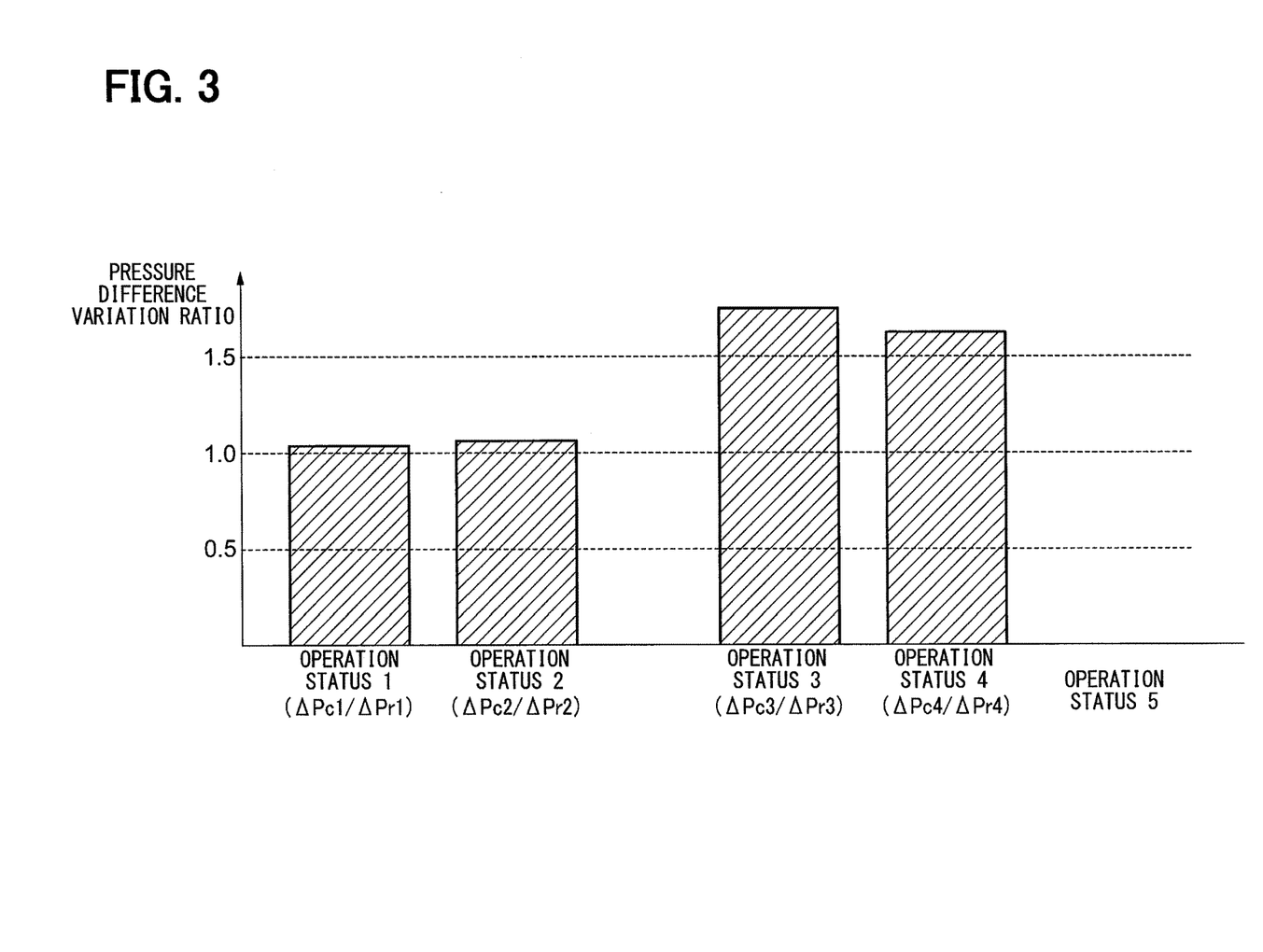
FIG. 3 is a graph illustrating a pressure difference variation ratio in each operational status of FIG. 2.

The variations in the actual pressure difference and the calculation pressure difference are explained, referring to FIG. 2 and FIG. 3. FIG. 2 illustrates variations in the flow rate of the exhaust gas which flows into the filter 12, the actual pressure difference, and the calculation pressure difference, when the speed of the vehicle GC is changed from the operational status 1 to the operational status 5. The lowest part of FIG. 2 illustrates variations in the actual pressure difference and the calculation pressure difference in each operational status (difference between the maximum value and the minimum value in each operational status). FIG. 3 illustrates the pressure difference variation ratio which is a ratio of the variation in the calculation pressure difference to the variation in the actual pressure difference in each operational status. The operational status 1 and the operational status 2 represent a case where the filter 12 is in a normal state. The operational status 3, the operational status 4, and the operational status 5 represent a case where the filter 12 is in the abnormal condition, as being melted.

As shown in the operational status 1 of FIG. 2, as the vehicle GC accelerates to raise the vehicle speed, the flow rate of the exhaust gas which flows through the exhaust piping 300 and flows into the filter 12 increases by $\Delta Q1$. For this reason, the actual pressure difference and the calculation pressure difference increase.

Because the filter 12 is normal in the operational status 1 as mentioned above, the variation in the actual pressure difference computed based on the signal received from the pressure difference sensor 314 is approximately equal to the variation in the calculation pressure difference. That is, the variation $\Delta Pr1$ in the actual pressure difference in the operational status 1 is approximately the same as the variation $\Delta Pc1$ in the calculation pressure difference. For this reason, as shown in FIG. 3, the pressure difference variation ratio ($\Delta Pc1/\Delta Pr1$) computed by the abnormality determiner 404 in the operational status 1 is approximately equal to 1.0.

After the acceleration of the vehicle GC in the operational status 1 is completed, the vehicle GC accelerates again, and the flow rate of the which flows into the filter 12 increases by $\Delta Q2$ in the operational status 2. The pressure difference variation ratio in the operational status 2 has the same tendency as the operational status 1. Namely, as shown in FIG. 3, the pressure difference variation ratio ($\Delta Pc2/\Delta Pr2$) computed by the abnormality determiner 404 in the operational status 2 is approximately equal to 1.0.

In contrast, in the operational status 3 where the excessive particulate matter has deposited on the filter 12, when the vehicle GC accelerates similarly to the operational status 1, and when the flow rate of the exhaust gas which flows into the filter 12 increases by $\Delta Q3$, the pressure difference variation ratio has different values. Specifically, first, since the filter 12 is melted, the exhaust gas easily passes through the filter 12. The pressure difference between the upstream side and the downstream side of filter 12 is reduced, and the actual pressure difference in the operational status 3 becomes smaller than the actual pressure difference in the operational status 1. In contrast, because the calculation pressure difference is computed as a pressure difference of the filter 12 in a normal state, as mentioned above, the calculation pressure difference in the operational status 3 is the same value as the calculation pressure difference in the operational status 1. For this reason, the pressure difference variation ratio ($\Delta Pc3/\Delta Pr3$) computed by the abnormality determiner 404 in the operational status 3 becomes larger than 1.0, as shown in FIG. 3.

After the acceleration is completed in the operational status 3 of the vehicle GC, the vehicle GC accelerates again, and the flow rate of the exhaust gas which flows into the filter 12 increases by $\Delta Q4$, in the operational status 4. The pressure difference variation ratio in the operational status 4 shows the same tendency as the operational status 3. That is, as shown in FIG. 3, the pressure difference variation ratio ($\Delta Pc4/\Delta Pr4$) computed by the abnormality determiner 404 in the operational status 4 becomes larger than 1.0.

After the acceleration is completed in the operational status 4 of the vehicle GC, the vehicle GC slightly accelerates again, and the flow rate of the exhaust gas which flows into the filter 12 increases by $\Delta Q5$, in the operational status 5. In the operational status 5, the abnormality determiner 404 does not compute the pressure difference variation ratio, because the variation in the pressure difference of the filter 12 cannot correctly be computed, in the operational status 5. The variation $\Delta Q5$ in the flow rate of the exhaust gas within a predetermined time period is smaller than a threshold value $\Delta Q0$. The threshold value $\Delta Q0$ is larger than $\Delta Q5$ and smaller than $\Delta Q4$.

The abnormality determiner 404 performs the abnormality determination of the filter 12 based on the pressure difference variation ratio which changes as mentioned above. That is, when the pressure difference variation ratio is approximately equal to 1.0, it is determined that an abnormality is not generated in the filter 12 (normal state). When a deviation amount between the pressure difference variation ratio and 1.0 becomes more than or equal to a threshold value, the abnormality determiner 404 determines that there is an abnormality in the filter 12.

For example, when the pressure difference variation ratio becomes 1.5 or more like the operational status 3 and the operational status 4 (when the deviation amount of the pressure difference variation ratio from 1.0 is larger than or equal to 0.5 on the plus side), it can be determined that an abnormality such as melting or crack has arisen in the filter 12. When the pressure difference variation ratio becomes 0.5 or less (when the deviation amount of the pressure difference variation ratio from 1.0 is larger than or equal to 0.5 on the reduced side), the actual pressure difference becomes large compared with the calculation pressure difference, such that it can be determined that an abnormality is generated such that excessive particulate matters deposit.

Figure 4:
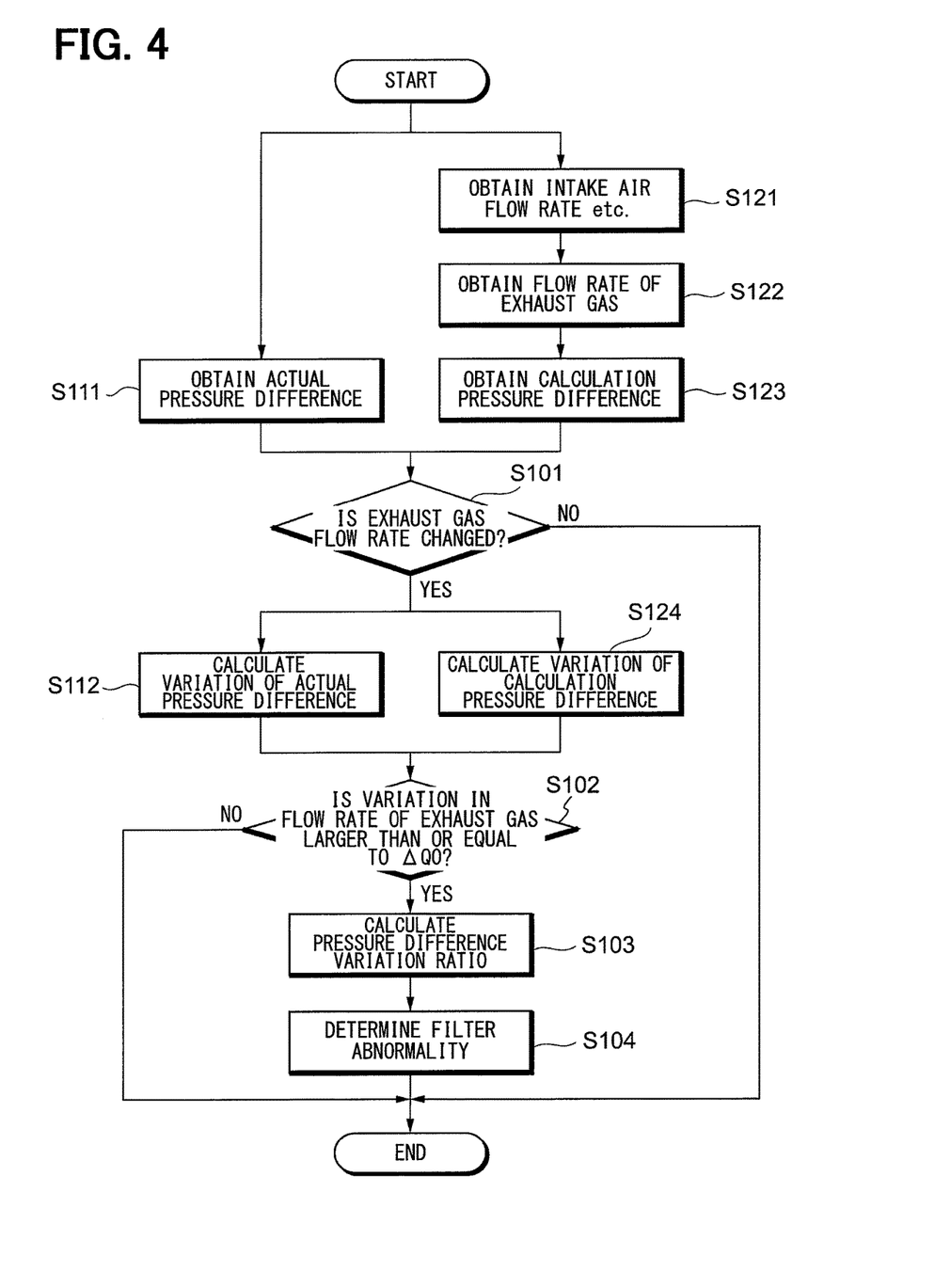
FIG. 4 is a flow chart illustrating a flow of processing executed by a control device of FIG. 1.

Then, a flow of processing performed by the control device 400 in the case of the abnormality determination of the filter 12 is explained, referring to FIG. 4. For convenience, it is assumed that the processing is comprehensively executed by the control device 400 while the processing is performed by each portion such as the actual pressure difference obtainer 401 of the control device 400 in details.

First, at Step S111 of FIG. 4, the control device 400 acquires the actual pressure difference. As mentioned above, the control device 400 performs the predetermined operation based on the signal received from the pressure difference sensor 314 to acquire the actual pressure difference.

In parallel to the processing of Step S111, the control device 400 acquires a flow rate of intake air and the like at Step S121. Specifically, the control device 400 performs the predetermined operation based on the signal received from the flow sensor 211 to acquire the intake air flow rate, and performs the predetermined operation based on the signal received from the air/fuel ratio sensor 311 to acquire the air/fuel ratio. Furthermore, the control device 400 performs the predetermined operation based on the signal received from the exhaust gas temperature sensor 312 to acquire the temperature of exhaust gas, and performs the predetermined operation based on the signal received from the pressure difference sensor 314 to acquire the pressure of exhaust gas.

Next, the control device 400 acquires the flow rate of exhaust gas at Step S122. Here, the control device 400 acquires the flow rate of exhaust gas with a well-known technique based on the intake air flow rate, the air/fuel ratio, the temperature of exhaust gas, and the pressure of exhaust gas acquired at Step S121.

Next, the control device 400 acquires the calculation pressure difference at Step S123. As mentioned above, the control device 400 refers the flow rate of the exhaust gas acquired at Step S122 to the table memorized beforehand, to acquire the calculation pressure difference.

Next, the control device 400 determines whether the flow rate of exhaust gas is changed at Step S101. When it is determined that the flow rate of exhaust gas is not changed (S101: No), the control device 400 ends the processing. When it is determined that the flow rate of exhaust gas is changed (S101: Yes), the control device 400 progresses to the processing of Step S112 and Step S124.

Next, the control device 400 calculates the variation in the actual pressure difference in response to the change in the flow rate of exhaust gas at Step S112. That is, the control device 400 calculates the difference between the maximum value and the minimum value in the actual pressure difference when the flow rate of exhaust gas changes.

In parallel to the processing of Step S112, the control device 400 calculates the variation in the calculation pressure difference in response to the change in the flow rate of exhaust gas at Step S124. That is, the control device 400 calculates the difference between the maximum value and the minimum value of the calculation pressure difference when the flow rate of exhaust gas changes.

Next, the control device 400 determines whether the change in the flow rate of exhaust gas within a predetermined time period is more than or equal to the threshold value $\Delta Q0$ at Step S102. When it is determined that the change in the flow rate of exhaust gas is not more than or equal to the threshold value $\Delta Q0$ (S102: No), that is, when the change in the flow rate of exhaust gas is too small such that the variation in the pressure difference of the filter 12 cannot be calculated correctly, the control device 400 ends the processing. When it is determined that the change in the flow rate of exhaust gas is more than or equal to the threshold value $\Delta Q0$ (S102: Yes), the control device 400 progresses to the processing of Step S103.

Next, the control device 400 calculates the pressure difference variation ratio at Step S103. That is, the pressure difference variation ratio which is a ratio of the variation in the calculation pressure difference to the variation in the actual pressure difference is computed based on the variation in the actual pressure difference computed at Step S112 and the variation in the calculation pressure difference computed at Step S124.

Next, the control device 400 performs the abnormality determination of the filter 12 based on the pressure difference variation ratio at Step S104. Here, as mentioned above, when the pressure difference variation ratio is larger than or equal to 1.5 (when the deviation amount of the pressure difference variation ratio than 1.0 is 0.5 or more on the plus side), the control device 400 determines that there is an abnormality such as melting or crack in the filter 12. When the pressure difference variation ratio is smaller than or equal to 0.5 or less (when the deviation amount of the pressure difference variation ratio than 1.0 is 0.5 or more on the minus side), since the actual pressure difference becomes large compared with the calculation pressure difference, the control device 400 determines that the filter 12 has an abnormality in which excessive particulate matters deposit.

As mentioned above, according to this embodiment, the abnormality determiner 404 performs the abnormality determination of the filter 12 based on the pressure difference variation ratio which is a ratio of the variation in the actual pressure difference and the variation in the calculation pressure difference in response to a change in the flow rate of exhaust gas. When the filter 12 has no abnormalities, such as excessive deposition of particulate matter, melting, or crack, the pressure difference variation ratio is approximately fixed at 1.0, not depending on the operational status of the engine 100. In contrast, if an abnormality arises in the filter 12, the pressure difference variation ratio changes. Therefore, the abnormality determination of the filter 12 is performed based on the pressure difference variation ratio, such that the determination accuracy can be raised without preparing a threshold value for each operational status of the engine 100.

Moreover, in this embodiment, the abnormality determiner 404 determines that an abnormality is generated in the filter 12, when the deviation amount between the pressure difference variation ratio and 1.0, which is a predetermined value, becomes 0.5 or more. If an abnormality such as excessive deposition of particulate matter, melting, or crack arises in the filter 12, the variation in the actual pressure difference is changed. As a result, the pressure difference variation ratio is also changed, and deviates from 1.0. In this embodiment, it is determined whether an abnormality arises in the filter 12 based on this deviation amount, such that the determination accuracy can be raised without preparing a threshold value for each operational status of the engine 100.

Moreover, in this embodiment, the abnormality determiner 404 performs the abnormality determination of the filter 12, when the flow rate of exhaust gas changes by $\Delta Q0$ or more within the predetermined time period. Therefore, the abnormality determination of the filter 12 is performed when the change in the flow rate of exhaust gas is large enough, since it is possible to compute correctly the variation in the pressure difference of the filter 12. Thus, the determination accuracy can be raised.

In the above, the embodiment is described, referring to an example. It should be appreciated that the present disclosure is not limited to the embodiments described above and can be modified appropriately within the scope of the present disclosure. The scope of the present disclosure is not limited to the range exemplified with the structure of the embodiment. The range of the present disclosure is shown by the appended claims, and also includes all the changes in the equivalence. In a case where a reference is made to the components of the respective embodiments as to the location, material, condition, shape and size, the components are not limited to those, and may be suitably changed. The elements in the embodiment can be combined appropriately unless a combination is technically impossible.

In the embodiment, the flow rate of the exhaust gas which flows through the exhaust piping 300 is obtained by performing a predetermined operation based on the signal received from the pressure difference sensor 314, but is not limited to this. For example, a flow rate sensor excellent in heat resistance may be disposed in the exhaust piping 300, and the flow rate sensor may detect the flow rate of exhaust gas directly.

Moreover, in the embodiment, the pressure difference variation ratio is determined as the ratio ($\Delta Pc/\Delta Pr$) of the variation ($\Delta Pc$) in the calculation pressure difference to the variation ($\Delta Pr$) in the actual pressure difference, but is not limited to this. For example, the pressure difference variation ratio may be determined as a ratio ($\Delta Pr/\Delta Pc$) of the variation (ΔPr) in the actual pressure difference to the variation (ΔPc) in the calculation pressure difference. In this case, it is determined that the filter 12 has an abnormality in which excessive particulate matter deposits, when the pressure difference variation ratio deviates to be reduced than 1.0. When the pressure difference variation ratio deviates to be increased than 1.0, it is determined that the filter 12 has an abnormality such as melting or crack.

Moreover, in the embodiment, the threshold value of the deviation amount for determining that an abnormality such as melting or crack is generated in the filter 12 is set the same value (0.5) as the threshold value of the deviation amount for determining that the filter 12 has an abnormality in which excessive particulate matters deposit. However, the threshold values can be set to different values without being limited to the above.

The invention claimed is:

1. An exhaust gas purification device that purifies an exhaust gas exhausted from an internal-combustion engine and flowing through an exhaust piping, the exhaust gas purification device comprising:
   a filter disposed in the exhaust piping to collect a particulate matter from the exhaust gas passing through the filter;
   an actual pressure difference obtainer that acquires an actual pressure difference which is an actual measurement value of a pressure difference between an upstream side and a downstream side of the filter;
   a flow rate obtainer that acquires a flow rate of the exhaust gas flowing into the filter;
   a calculation pressure difference calculator that calculates a calculation pressure difference which is a calculated value of the pressure difference between the upstream side and the downstream side of the filter in a normal state when the exhaust gas flows into the filter with the flow rate acquired by the flow rate obtainer; and
   an abnormality determiner that performs an abnormality determination of the filter, wherein
   the abnormality determiner performs the abnormality determination of the filter based on a pressure difference variation ratio which is a ratio between a variation in the actual pressure difference and a variation in the calculation pressure difference in response to a variation in the flow rate of the exhaust gas.

2. The exhaust gas purification device according to claim 1, wherein
   the abnormality determiner determines that an abnormality arises in the filter, when a deviation amount between the pressure difference variation ratio and a predetermined value becomes more than or equal to a first threshold value.

3. The exhaust gas purification device according to claim 1, wherein
   the abnormality determiner performs the abnormality determination of the filter, when the variation in the flow rate of the exhaust gas within a predetermined time period is more than or equal to a second threshold value.

* * * * *